Feb. 27, 1962 S. P. WILLITS ET AL 3,023,317

PARALLAX INTERVAL SENSING DEVICE

Original Filed Jan. 26. 1956 6 Sheets-Sheet 1

Inventors
Samuel P. Willits
William L. Mohan
By Louis Bernat
Attorney

Inventors
Samuel P. Willits
William L. Mohan
By Louis Bernat
Attorney

Inventors
Samuel P. Willits
William L. Mohan
By Louis Bernat
Attorney

PARALLAX INTERVAL SENSING DEVICE

Original Filed Jan. 26, 1956

6 Sheets-Sheet 4

Inventors
Samuel P. Willits
William L. Mohan
By Louis Bernat.
Attorney

PARALLAX INTERVAL SENSING DEVICE

Original Filed Jan. 26, 1956 6 Sheets-Sheet 5

Inventors
Samuel P. Willits
William L. Mohan
By Louis Bernat
Attorney

Inventors
Samuel P. Willits
William L. Mokane
By Louis Berner
Attorney 3,023,317

PARALLAX INTERVAL SENSING DEVICE

Samuel P. Willits, Mount Prospect, and William L. Mohan, Prospect Heights, Ill., assignors to Chicago Aerial Industries, Inc., Village of Barrington, Ill., a corporation of Delaware Original application Jan. 26, 1956, Ser. No. 561,485, now Patent No. 2,960,908, dated Nov. 22, 1960. Divided and this application Aug. 22, 1960, Ser. No. 51,028
10 Claims. (Cl. 250—220)

This invention relates to optical methods for determining the distance from a plane of reference of objects in motion, or for determining velocities of such moving objects at a distance, without physical contact with said objects.

More specifically, this invention provides for optical means for sensing a parallax interval of objects in motion and electronic methods for determining a comparison or measurement of their respective distance or velocity. Furthermore, this invention also provides methods and means for comparing the relative spatial positions of individual members of a group of related objects rotating at or near a common plane of reference.

Heretofore, available means for parallax interval sensing applied to moving objects depend either upon stroboscopic effects or upon direct contact with the moving objects. Stroboscopic methods generally rely upon direct visual observation of moving elements of machines and are affected by ambient illumination thus providing qualitative results; furthermore, these methods do not lend themselves to use with automatic or remote control systems.

Direct contact methods of interval measurement when applied to moving objects require contact for completing the electrical circuits utilizing audible, visual, or tactual indication and do not lend themselves to use with automatic or remote control systems.

Many modern mechanical devices or processes contain elements in high speed motion during operation wherein the relative position of these elements may depart from that intended or designed configuration. The measurement of the configuration of these elements during operation has hitherto presented a serious problem which has hampered the adjustment and advancement of development of certain high speed rotating machines. Such problems relative to rotating machines arise in the positioning of turbine buckets, propeller tips, helicopter blades, and the like.

This invention provides a basic means for determining the ratio of distance to transit time for objects moving in sequence before it. If the velocities of the respective objects are the same during the transit intervals, as is usually the case in rotating machinery, then distance from the sensing device for any two objects may be compared by comparing their transit times. Thus, the differences of position of successive objects may be measured, and the errors of adjustment or operation determined. Moreover, when the object velocity is known during the transit interval, the object distance may be determined directly from a measurement of the transit time.

A principal object of this invention is to provide a means for determining the spatial distance error of moving objects without physical contact.

Another object of this invention is to provide for unique and simple construction of the sensor elements used in the sensing system in order to determine the parallax interval of the transit of a moving object.

In accordance with the principles of this invention, the determination on the moving object is made by an optical sensing device of which one embodiment includes essentially a photo-electric cell, an objective lens, and an opaque member therebetween containing apertures arranged on opposing sides equidistant from the optical axis of the lens on a straight line intersecting the lens at right angles. The straight line function also being parallel to the direction of motion of the object which coincides with the optical axis of the lens. These cooperating elements are arranged within an opaque housing. The apertures and the lens define two ray bundles with a fixed parallax angle therebetween which impinge upon the photo-electric cell in a singular direction. With the sensing device arranged such that its parallactic rays cross the track path of a moving object, the object may block illumination to the sensing device, first at one ray bundle and then the next in sequence in a manner such as to produce two corresponding electrical signal pulses at the photo-electric cell. The time interval between the signal pulses therefore becomes a measurement of the parallax interval for the transit of the leading edge of the moving object. If the velocity of the object is known, its distance from the sensing device is readily determinable from the parallax interval with suitable electronic circuit means. If the object is one of a series of uniformly rotating members such as the blades of a fan, the relative blade track positions are similarly determinable from a combination of the parallax intervals and the times between parallax intervals.

Referring now to the drawings wherein similar reference numerals and characters are applied to similar elements:

Figure 1:
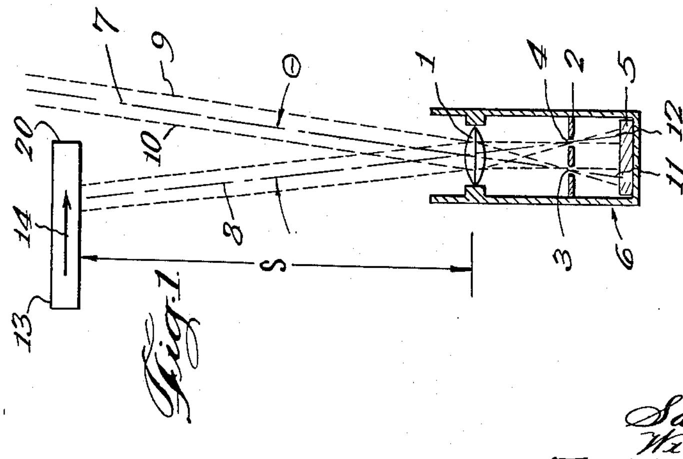
FIGURE 1 is a schematic illustration of a method of operation of the optical sensing device of this invention.

Referring to FIGURE 1, which illustrates the principles of the parallax interval sensing system, the configuration describes a lens 1, an opaque collimating disc or member 2 containing a plurality of apertures 3 and 4, and a photoelectric cell 5 which are contained within an opaque housing 6. The disc 2 lies at the focal plane of lens 1; and the light within collimated ray bundle 7 bounded by ray lines 9 and 10 will come to a focus at the aperture 3 and impinge upon photoelectric cell 5 at 11. Similarly, light in collimated ray bundle 8 will come to a focus at 4 and impinge at surface 12 of the photocell 5. The angle $\theta$ between ray bundles 7 and 8 as designated as the parallax angle. The apertures 3 and 4 are preferably located in alignment with and are equidistant from the optical axis of the lens 1. The parallax angle $\theta$ is then determined by the focal length of the lens and the spacing between apertures 3 and 4. The apertures may also be elongated slits oriented at right angles to the direction of object transit.

In addition, the apertures 3 and 4 may be circular or some other shape, or they may be transparent or translucent areas above or superimposed upon the disc 2.

Figure 2:
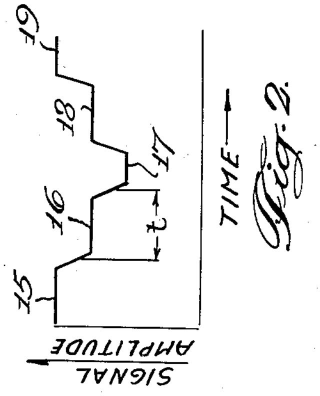
FIGURE 2 is a graphical illustration of the electrical signal from the optical sensing device shown in FIGURE 1.

Consider an opaque object 13 moving in the direction of the arrow 14 as indicated, and specifically referring to FIGURE 2, the signal level from the photoelectric cell 5 may be represented qualitatively as 15 before the object 13 has crossed ray path 8. As the leading edge 20 crosses ray bundle 8, the signal level may be represented as dropping to a value 16. As the object 13 continues and intercepts ray bundle 7, the signal level may be represented as dropping to a level represented at 17. As the trailing edge uncovers the ray paths in succession the signal level may be represented as rising to values 18 and 19 respectively. Since in practice the width of the ray bundles can be made very small, the time position of the slope between steps may be determined with precision. The time interval $t$, therefore, indicated in FIGURE 2, represents the transit time for the leading edge 20 of object 13 from ray path 8 to ray path 7. The value $t$ is therefore the parallax interval for the transit of object 13.

Figure 3:
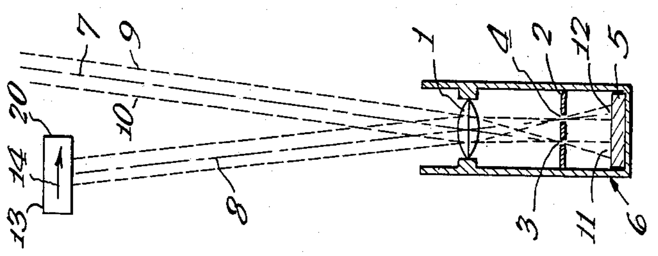
FIGURE 3 is a diagrammatic representation of a modified embodiment illustrated in FIGURE 1.
Figure 4:
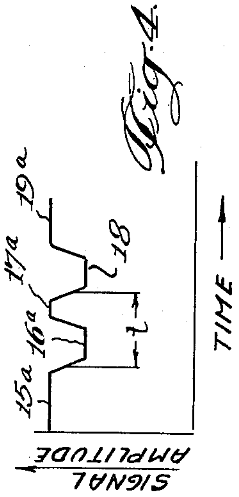
FIGURE 4 is a graphical illustration of the electrical signal generated from the sensing device as shown in FIGURE 3.

The conditions represented in FIGURES 1 and 2 are obtained when the length of the object 13 is greater than the distance encompassed by the ray bundles 7 and 8 at the track path. However, should the object 13 be shorter as indicated in FIGURE 3, the corresponding signal changes 15_a_ through 19_a_ inclusive, will be as indicated in FIGURE 4; and the parallax interval will be given by $t$ corresponding again to the intercepts of the leading edge 20 of the object 13 with the ray paths 7 and 8 in sequence. If the associated electronic, circuit means is arranged to respond only to changes of signal amplitude in the lower direction and ignore the changes in the upper direction, then no difference exists in the determination of $t$ from either signals developed in FIGURE 2 or in FIGURE 4. While the time interval $t$ is taken in response to the transit of the leading edge 20 of the object 13 as explained, it is also apparent that the associated electronic circuit means may similarly be arranged to respond only to the changes in the upper direction thereby determining a time interval for the slopes between levels 17 and 18 and 18 to 19 in FIGURE 2 corresponding to the transit of the trailing edge of the object. It can be seen that this condition would similarly be obtained for the input signal of FIGURE 4.

Let V equal the velocity of the object 13 as represented by numeral 14 in FIGURE 1. Considering the leading edge 20, the distance which it travels during half the transit interval, that is to the optical axis, is equal to ½ V$t$, neglecting the width of the ray bundle which in practice can be made negligible.

Let S equal the distance of the object track path to the sensing device as indicated in FIGURE 1, then $$S=\frac{Vt}{2\tan\frac{\theta}{2}}$$

This relationship shows that from the parallax angle and the parallax interval or transit time, the distance to the object may be determined if its velocity is known.

Furthermore, for a series of connected objects such as the blades of a fan, rotating at constant speed, it follows from the above that the parallax intervals $t_a$, $t_b$, $t_c$, etc., corresponding to blades $a$, $b$, $c$, etc., respectively, are related to the blade distances thus:

$$\frac{S_a}{t_a}=\frac{S_b}{t_b}=\frac{S_c}{t_c}$$

and for any two blade parameters $$\frac{S_a}{S_b}=\frac{t_a}{t_b}$$

which indicates that in comparing any two blades the ratio of blade distances may be determined without a measurement of blade velocity.

However, since the time interval between successive blades transits is also readily measurable with the sensing device described, it follows that for rotating equipment, such as the fan blades, a method for measurement of velocity may be readily obtained from the determination of the time between successive blade transits which we will henceforth designate as T. If there exist $n$ equally spaced fan blades, then the linear velocity:

$$V=\frac{2\pi R}{nT}$$

where R is the blade radius at the point of measurement. From the above relationship:

$$S=\frac{\pi Rt}{nT\tan\frac{\theta}{2}}$$

Where the difference of position between any two blades, $a$ and $b$, is desired the relationship:

$$S_a-S_b=\frac{\pi R}{nT\tan\frac{\theta}{2}}(t_a-t_b)$$

establishes this measurement in order to determine a moving object track position.

Figure 5:
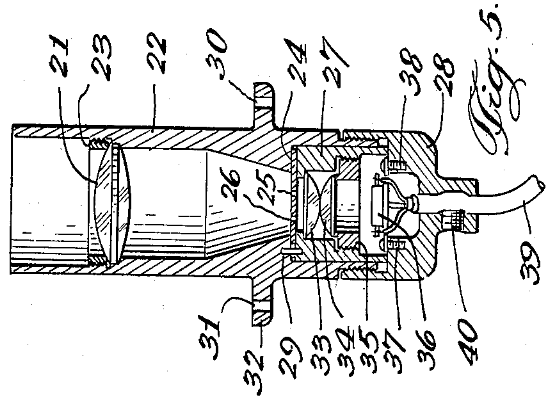
FIGURE 5 is a side view, partly in section, illustrating an end window embodiment of a sensing device.

A detailed illustration of the photo-conductive type photocell is shown in FIGURE 5. The objective lens 21 is retained in the upper end of housing 22 by a threaded lock ring 23. A metallic disc 24 containing a plurality of small circular apertures 25 and 26, although other aperture configurations are adaptable, is retained at the focus of lens 21 by means of an assembly body 27 which is in turn clamped by an end cap 28 threaded to a housing 22. The disc 24 is correctly oriented by means of a pin 29 and a cooperating hole in the disc 24, said hole being aligned with the apertures 25 and 26, which are thereby in turn aligned with mounting holes 30 and 31 on a housing flange 32. The assembly body 27 contains a cooperating pair of condensing lenses 33 and 34 held in position by threaded lock ring 35; said lenses 33 and 34 being designed and positioned to direct light entering apertures 25 and 26 to a common point (or restricted area) on the sensitive region of photocell 36. The photocell 36 is held in position by screws 37 and 38 to end cap 28 and electrically connected by wires in a cable 39 which is in turn held by clamp 40.

The photocell 36 is preferably illustrated as a photoconductive type such as lead sulphide, cadmium sulphide, cadmium selenide, or similar structure. The photocell 36 may also be any of a variety of barrier layer type, photoemissive type, n-p junction type, or photo-transistor type. In the case of photo-transistors or other types having very small sensitive target areas, another arrangement may employ two separate cells mounted immediately below apertures 25 and 26, in which case the condensing lenses 33 and 34 would not be required.

Figure 6:
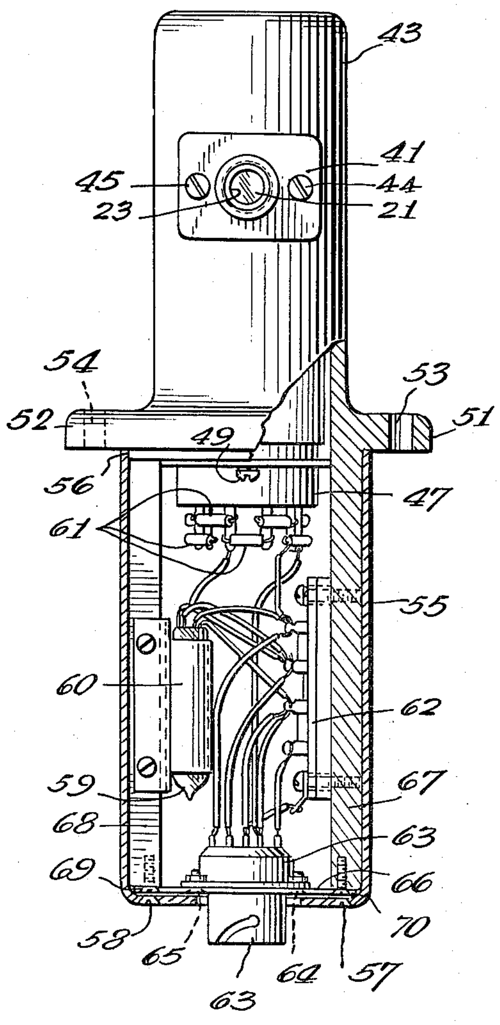
FIGURE 6 is an enlarged side view, partly in section, illustrating a side window embodiment of a sensing device.
Figure 7:
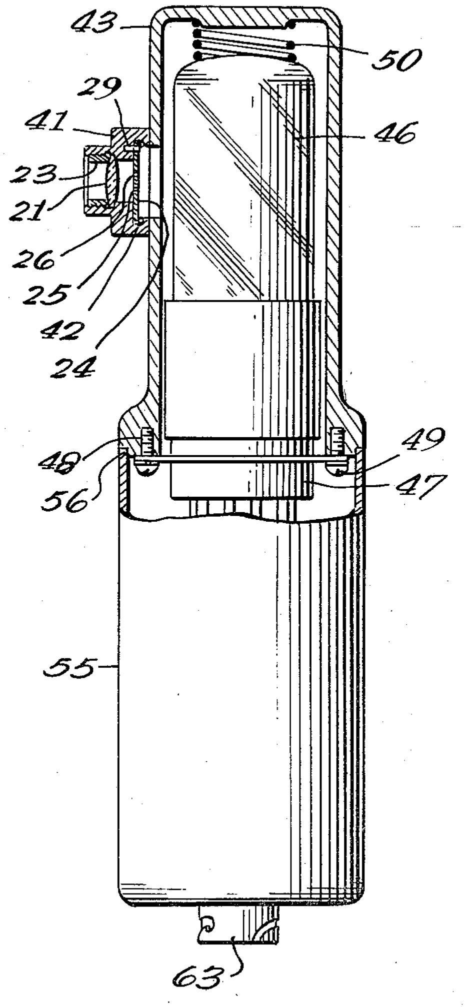
FIGURE 7 is an enlarged side view, partly in section, of the device shown in FIGURE 6 rotated at 90 degrees.

FIGURES 6 and 7 show two alternate views of another embodiment of a sensing device employing a photo-multiplier type photocell. In this representation the principle of sensing parallax interval is identical with that of FIGURES 1, 3 and 5. The lens 21 is held in lens housing 41 by a threaded lock ring 23. A metallic disc 24 containing the two apertures 25 and 26 is positioned at the focus of lens 21 and held in position by snap ring 42, and further held in orientation by pin 29 through a cooperating hole or notch in the disc 24. The lens housing 41 is affixed to photocell enclosure 43 by screws 44 and 45, and positioned such that the light entering the apertures 25 and 26 falls directly upon the photo-cathode (not shown) of photo-multiplier tube 46 which may be a type well known to those versed in the art. The condensing lenses as used in the design of FIGURE 5 are unnecessary here since the sensitive area of the photo-cathode of the photo-multiplier tube 46 is generally sufficient in size to respond to the light issuing from apertures 25 and 26. In this design the focal length of lens 21 may be about half an inch with apertures 25 and 26 having a diameter of about .003 inch and a spacing of about .070 inch. The resulting parallax angle $\theta$, indicated in the diagram of FIGURE 1 would, from the above dimensions, therefore be about 8 degrees.

The photo-multiplier tube 46 is retained in enclosure 43 by means of a socket 47 which in turn is held by screws 48 and 49. The tube 46 is spring held in the socket 47. The mounting of the sensing device is effected by means or ears 51 and 52 through which are provided mounting holes 53 and 54 respectively. A metallic cover 55 is piloted at diameter 56 and retained by means of screws 57 and 58, enclosing and shielding the lower section of the device. Within this area an electronic tube 59 held by clamp 60 provides a cathode follower type output coupling means. Resistors such as 61 provide distribution of dynode voltages. A terminal board 62 provides electrical connection points between leads from socket 47, tube 59, and connector 63. Said connector 63 being supported by screws 64 and 65 from a plate 66 which in turn is mounted by screws 69 and 70 (slightly offset from screws 57 and 58) to arms 67 and 68 which are integral with enclosure casing 43.

Since the several embodiments of this invention are adapted to the determination of the distance between a portion of a moving object and a datum plane, a similar determination can be performed for other portions of the moving object. Thus, from the distance data for any desired number of portions of the moving object, the conformity thereof while in motion can be determined. Accordingly, the strain and displacement effects of dynamic stresses imposed upon the moving body can be determined.

In particular, using the blade of a helicopter rotor as an example, the deflection of portions thereof at different radial distances from the rotational axis can be determined while the rotor is in motion and while it is subjected to the action of vibration, centrifugal force, and aerodynamic loading. The determination of position, and consequently the deflection of portions of the rotor blade at different radial distances from the rotational axis, can be accomplished either by means of a plurality of parallax interval sensing devices disposed at different radial distances from the rotational axis, or by means of one or more parallax interval sensing devices arranged to be controllably movable to positions at different radial distances from the rotational axis, or both.

Figures 8, 10:
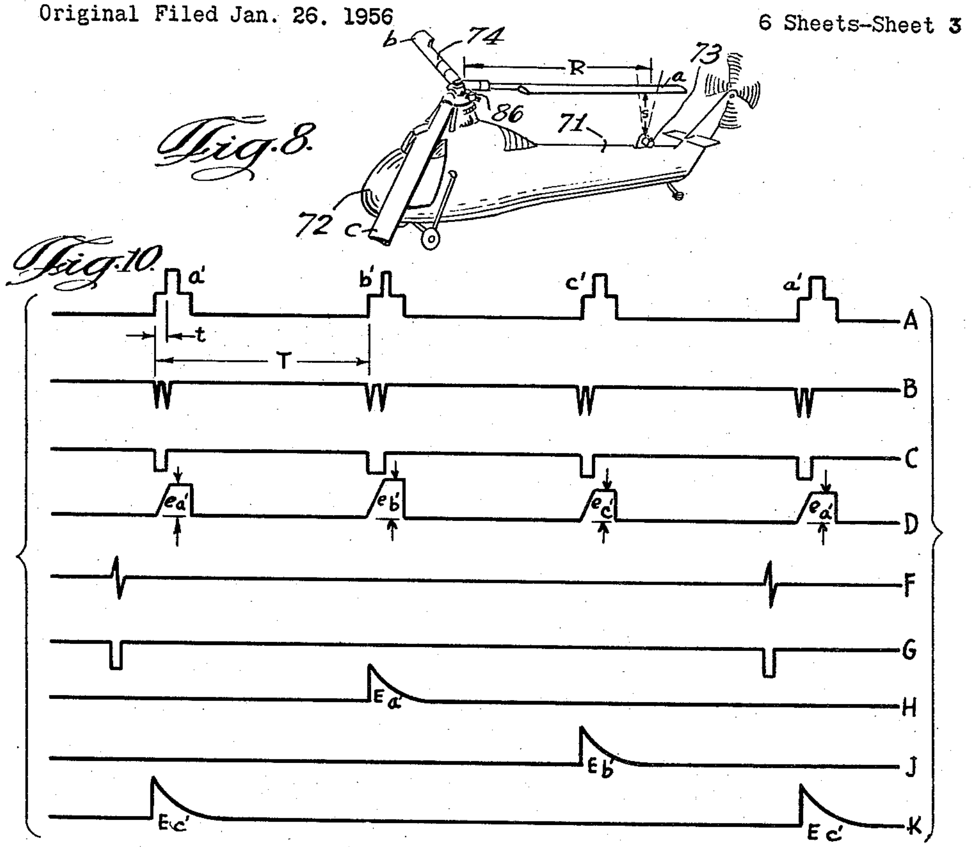
FIGURE 8 is a schematic illustration of a sensing device system installed upon a helicopter.
FIGURE 10 is a corresponding graphical representation of the voltage waveshapes occurring within the block diagram circuitry of FIG. 3.

In order to determine the relative blade track positions either on the ground or during flight, let us consider a helicopter with a sensing device affixed to the fuselage. FIGURE 8 illustrates a common type of helicopter employing a single three bladed rotor. However, the use of such a helicopter in our explanation is not to be interpreted as a limitation on the method to be described since helicopters with dual rotors and rotors with two or more blades, lend themselves equally well to this method of blade track determination. On the fuselage 71 of the helicopter 72 is affixed a sensing device 73 at a distance R from the rotational axis to the rotor 74. For the purposes of this description, the sensing device incorporates a photo-multiplier photo-cell and may be considered as of the type shown in FIGURES 6 and 7. We shall next describe one circuit method for utilizing said sensing device so mounted on said helicopter to permit a comparison of blade track position during rotation of the rotor either on the ground or in flight.

Figure 9:
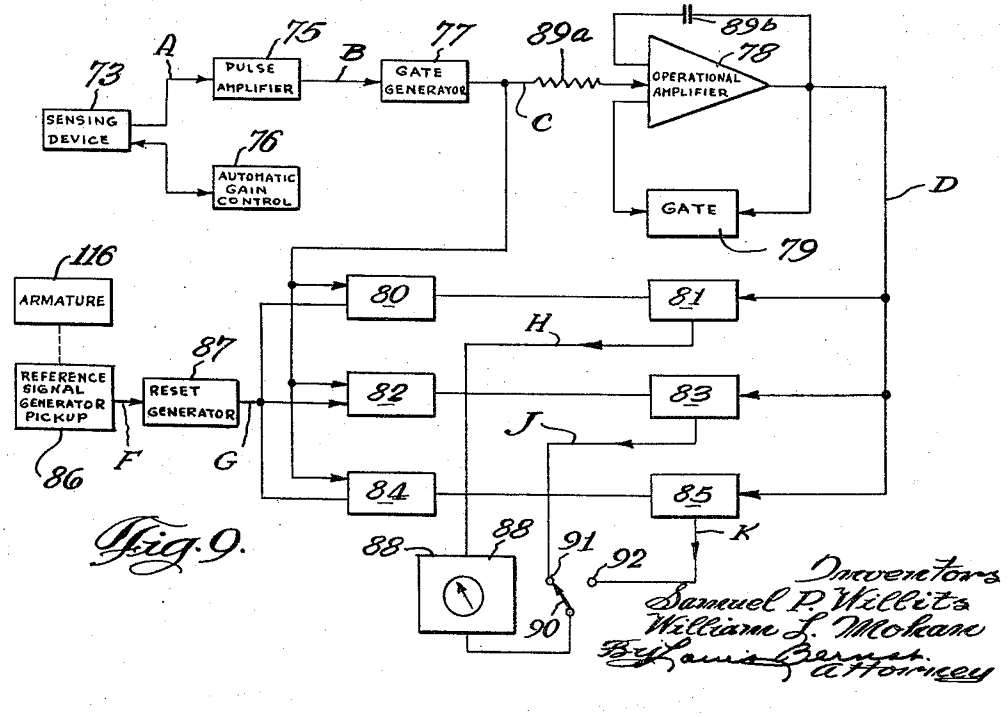
FIGURE 9 is a schematic block diagram representation of a preferred circuit arrangement used in conjunction with the sensing device of FIGURE 6.

FIGURE 9 indicates schematically in block diagram form, the electronic circuitry used with the sensing device 73. As already described, the sensing device of FIGURES 6 and 7 employs a photo-multiplier photo-cell together with an output coupling tube which reduces the output coupling impedance in a manner well known by those versed in electronic art. Since the output from the sensing devices is not characterized as the photo-cell current but rather as a voltage occurring across an output load resistance, the output sequence of signal pulses is inverted, polarity wise, from that indicated in FIGURE 2, and is as shown by the step signals A in FIGURE 10 which occur at corresponding location A in the diagram of FIGURE 9.

FIGURE 10 is a graphical diagram of the voltages which occur at various times and positions within the circuitry of FIGURE 9. The letters *a'*, *b'* and *c'* indicate, in vertical position, the time regions of transit of rotor blades *a*, *b* and *c* respectively. Time increases from left to right. The letters A, B, C, etc., indicate the sequence voltage time relations occurring at the correspondingly lettered positions within the circuitry of FIGURE 9.

Since the sensing device 73 of FIGURES 8 and 9 is pointed skyward, it may be subjected to very large extremes of ambient light level at various testing times. The effect of this may be to alter the base level and pulse heights of signals at A in FIGURE 10, which in turn may impose a difficult signal level tolerance restriction on the pulse amplifier and shaper circuit 75 of FIGURE 9. To avoid this, an automatic gain control device 76 is incorporated which operates from the ambient signal level output pulse height of the photo-multiplier within the device 73, and supplies to its final dynode a biasing voltage such as to hold the output pulse height within substantially constant limits over an ambient light range of about a thousand to one. The exact circuit method for accomplishing this is not detailed further here, since such details are readily understandable by those versed in the electronic art.

The block 75 contains circuits for amplifying the pulses, identifying the beginning and end of the parallax interval, and forming sharp pulses to designate the beginning and end of said interval. The result is that a sharp rise in the signal input to 75 produces a sharp output pulse as indicated at B in FIGURE 10. A sharp decrease in signal input is rejected by the circuitry and produces no output pulse. Thus each associated pair of pulses from 75 mark the beginning and end of a parallax interval for a given blade transit.

Block 77 represents a precision gate generator which is a form of rapid response electronic switch or a special form of what is often referenced in the art as a "flip-flop" circuit. The first input pulse triggers the circuit in one direction such as to put an output voltage at substanially constant level. The second pulse restores the circuit to its initial state reducing the output voltage to zero or substantially so. Thus the output of 77 is a series of precision pulses as indicated by C in FIGURE 10, wherein the pulse width is a measure of the parallax interval *t* and the reoccurrence time is a measurement of the time between successive blade blade transists T; each pulse corresponding to a given blade, and each pulse being of constant amplitude. Block 78 represents an operational amplifier arranged to provide integration of the input signal by means of input resistor 89*a* and feedback capacitor 89*b*. Essentially the amplifier is capable of amplifying direct current signals so that the polarity of the output signal is opposite to that of the input signal and the amplitude of the output signal is greater than that of the input signal.

The amplitude of a signal input pulse at C determines a rate of voltage rise in the output signal at D while the input pulse duration determines the duration of voltage rise at the output. Since the amplitude of input pulses at C is constant, the output rise slope is therefore constant, and the amplitude of final output voltage at D, which is indicated as $e_a$, $e_b$ and $e_c$ in FIGURE 10, therefore a measure of the parallax interval time for the transit of the corresponding blade *a*, *b* and *c* respectively.

The block 79 represents another gating circuit which serves to reset the operational amplifier output voltage to zero before the arrival of the next succeeding actuating pulse. However, before this reset occurs sufficient time has been allowed to store the output level in one of the storage gates 81, 83 or 85, respectively, corresponding to the blade identification.

Blocks 80, 82 and 84 respectively, represent a three digit ring counter circuit, the number of digits in the ring corresponding to the number of rotor blades.

Successive pulses from point C transfer the count in sequence from 80 to 82 to 84 to 80 and continuing. This process serves to open the storage gates 81, 83, 85 and 81 in their respective sequence. To insure correct gate phasing such that counter position 80 and storage gate 81 will always correspond with blade *a*, a reference pickup device 86, such as a magnetic pickup, a radioactive pickup or a capacitive pickup, may be used; and a reset generator 87 is employed in combination with the reference device 86. A preferred embodiment includes a thin disc of magnetically soft material which is affixed to the blade which is to be identified as blade *a*. The pickup device 86 is mounted in a fixed position such that said disc will pass in close proximity during rotation of the rotor blades, and thus produce an identification pulse indicated at F in FIGURE 10. The position of the pickup device 86 is so phased relative to the sensing device 73, that the identification pulse F will occur slighly prior to the signal pulse at A corresponding to blade *a*.

Block 87 represents a reset generator which provides an output pulse from said identification pulse, indicated as G in FIGURE 10, that serves to transfer the count to position 84 if it is not already there, so that the next pulse at C will reset the ring counter circuit to position 80 corresponding to blade *a*.

Referring to the storage gates 81, 83 and 85, as the transit of blade *a* occurs, a counter position 80 is actuated as described. This opens a gate in 81 permitting a capacitor within it to charge to the voltage $e_a$ at D, said gate then closes after a suitable time delay. Sumultaneously a discharge circuit H to comparator 88 is closed so as to permit the capacitor in 81 to come to full charge.

As the transit of blade *b* occurs, the counter position is transferred to 82 which discharges circuit H, permitting the voltage $E_a$ from 81 shown in FIGURE 10 to decay into comparator 88. Simultaneously a gate in 83 opens permitting a like capacitor within it to charge to charge to the voltage $e_b$ at D, which gate then re-closes as above and the cycle is repeated. As the transit of blade *c* occurs, 83 discharges into comparator 88 through circuit J, and 85 charges to the voltage $e_c$ in like manner.

Thus is can be seen that each storage gate circuit charges to a voltage corresponding to the parallax interval for a given blade transit, and may discharge through a comparison circuit for the remainder of a rotor revolution interval.

The comparison circuit 88 provides a means of indicating on a zero center meter movement the difference between the discharge voltages of two storage gates such as gates 81 and 83 corresponding with blades *a* and *b* respectively. If the switch 90 is thrown from position 91 to position 92 then the comparison circuit 88 will similarly indicate the difference between voltages corresponding to position of blades *a* and *c*.

If the ballistics of the meter movement or if the time constant of its associated circuit is 88 is such as to average out the discharge pulsations, then it can be shown that the deflection of the meter due only to the voltage from one storage gate such as 81, is proportional to said voltage divided by the time interval between successive pulses.

The above arrangement therefore indicates a method of using the parallax interval sensing device to effect a comparative measurement of the track positions of helicopter rotor blades when operating either on the ground or in flight. This method is readily adaptable to measurement of differences of less than 1% of the distance S.

In another modification the reference detector 86 may be dispensed with entirely by employing a commutator attached to the rotor shaft or remotely driven from the rotor by means of coupled synchros. In this instance the ring counter circuit such as elements 80, 82 and 84 were not needed since the gating or switching of storage circuits was performed directly by the commutator itself.

In another circuit modification a high input impedance at the comparator 88 may be employed so as to not discharge the storage circuits 81, 83 and 85, to permit employment of circuit means and time constants for reducing the meter pulsations. Calibration of the device could be effected by incorporating control means for adjusting the voltage height of pulses at C from the gate generator 77 until a reference voltage reading were obtained at D. The meter reading at 88 could then become a percentage change in this reference value which could be related as a percentage change in the distance S.

A still further variation may employ two meter circuits, one for differences between blades such as *a* and *b* with the other for differences between blades *b* and *c*. Separate meter circuits may also be employed using one for each blade, or using one meter and switching it to obtain a direct reading on each blade.

The invention requires a source of light or radiant energy for operation, and while the foregoing description has indicated this source as light from the sun or sky, it must not be considered that the invention is thus limited. It should be apparent that the principle of this invention is equally operative with either transmitted or reflected light.

The light source itself may be other than a solar source such as any of a variety of electrically excited light sources, chemically excited sources fluorescent sources or flames, or the radiation of the object. The spectral energy may be entirely in the visible range or in the ultra-violet or infra-red when suitably sensitive photo-electric detectors are employed. A preferred arrangement for the detection of vehicular traffic velocity may be to use an infra-red spotlight with energy mainly in the region just beyond the visible from about 0.8 to .12 micron wave length cooperating with photo-electric cells such as lead sulphide having their peak sensitivity in this region.

Figure 11:
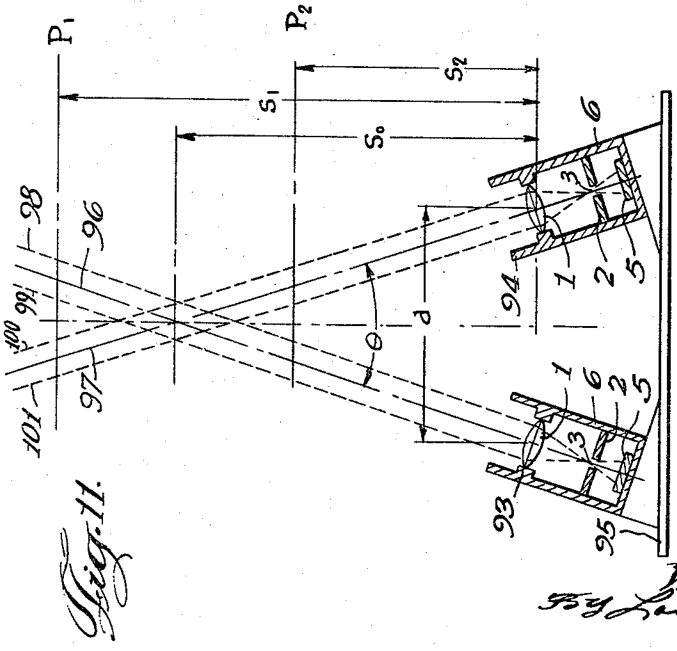
FIGURE 11 is a schematic illustration of another embodiment of the sensing device system enlarged to facilitate explanation.

FIGURE 11 illustrates another embodiment for effecting parallax interval sensing. In this instance two sensing units 93 and 94 are employed. Each unit consists of a lens 1, an opaque disc 2 positioned at the focal plane or surface of lens 1, said disc 2 containing a small aperture 3 preferably located on the optical axis of lens 1, and a photocell 5, all contained within an opaque housing 6. Sensing units 93 and 94 are fixed to a suitable mounting base 95 so that the optical axes 96 and 97 of lenses 1 are preferably in the same plane defining a parallax angle $\theta$ therebetween, and defining collimated ray bundles thereabout, said ray bundles in turn defined in FIGURE 11 by ray lines 98, 99, 100 and 101.

Let the distance from the sensing units to the intersection of optical axes be represented by $S_0$ as indicated in FIGURE 11, and consider an object moving along track path $P_1$ and at a greater distance $S_1$ from the sensing units also as indicated, the following relationship may be derived:

$$S_1=S_0+\frac{Vt}{2\tan\frac{\theta}{2}}$$

Figure 12:
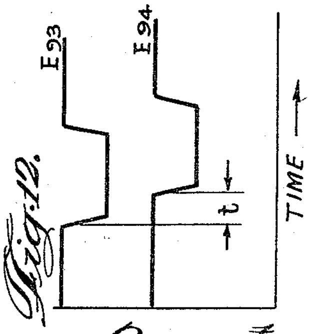
FIGURE 12 is a graphical illustration corresponding to the electrical signals developed from the sensing device units of FIGURE 11.

FIGURE 12 indicates the type of signal pulses generated in units 93 and 94 due to the transit of an object from right to left along path $P_1$ of FIGURE 11. $E_{93}$ represents the signal from unit 93 and $E_{94}$ represents the signal from unit 94. The time interval between the leading edges of said signal pulses represents the parallax interval, $t$. The two signals may of course be combined or added, in which case a signal similar to that of FIGURE 2 would be obtained.

Should the object move in the same direction along path $P_2$ at a distance from the sensing units $S_2$ which is less than $S_0$ then it may be similarly shown that:

$$S_2=S_0-\frac{Vt}{2\tan\frac{\theta}{2}}$$

Figure 13:
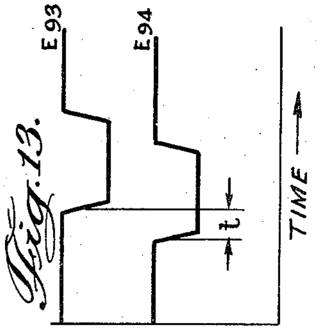
FIGURE 13 is a graphical illustration corresponding to the electrical signals developed by the sensing device units of FIGURE 11 under another set of conditions.

In this case the signal pulses are as shown in FIGURE 13, the pulse from unit 94 leading the pulse from unit 93. If the parallax interval condition of FIGURE 13 be considered as negative in contrast with the condition of FIGURE 12 taken as positive, then the distance subscripts may be dropped and the general expression:

$$S=S_0+\frac{Vt}{2\tan\frac{\theta}{2}}$$

may be used for the distance S to a track path on either side of $S_0$. Since the signal pulses from 93 and 94 do occur separately and since a pulse sequence distinction may be made in associated circuitry, it also therefore follows that a zero parallax interval between two such signal pulses may be determined by measurement and an object passing at $S_0$ thus identified.

The method of FIGURE 11 has certain inherent advantages over the method of FIGURE 1. The component $S_0$ may be determined readily from the physical dimensions of parallax angle $\theta$ and sensing unit separation $d$. The location of the sensing units are preferably taken herein as the location of the nodal point of lenses 1, as identified by the following realtionship:

$$S=\frac{d+Vt}{2\tan\frac{\theta}{2}}$$

Since the use of two distinct sensing elements permits the identification of simultaneous transit pulses or zero parallax interval, measurement of distance may be made at or very near the distance $S_0$ reducing the importance of vibrational disturbances of the sensing device and of errors in the determination of velocity. The use of this principle provides sufficient increase in sensitivity of spatial measurement that the device may be used to detect and indicate the accumulation of ice on helicopter rotor blades while in flight.

In fact a special case arises for the condition where the track path occurs at $S_0$. In the device of FIGURE 11, consider that means be provided to mechanically change or adjust either the unit separation $d$ or the parallax angle $\theta$ either by servo or manual means. Then to determine the position of a reoccurring rotational device the value of $S_0$ may be adjusted mechanically until the parallax interval $t$ equals zero. The track position is then equal to $S_0$.

A unique application of the dual sensing unit method of FIGURE 11 incorporating servo actuated system for measuring the variable parallax angle $\theta$ may be used to determine the altitude of a flying aircraft. In this instance the signals from 93 and 94 which are directed toward the terrain below are seldom discrete pulses but more commonly irregular continuous wave shapes. Since these wave shapes are essentially identical in character but are displaced in time sequence, a servo system capable of adjusting the parallax angle to match the time sequence will thus determine the distance to the ground.

Another application of this principle is directed toward the determination of automobile speeds on a roadway or in the determination of traffic flow velocities on high speed heavily travelled highways. The velocity determination can thus be made essentially independent of the lane position of the moving traffic. In addition, the system may be adapted to determine muzzle velocities of projectiles.

In the use of signals from the sensing device, reference has mainly been made for detection of the parallax interval due to transit of the leading edge of the object. The system is also capable of separating the leading edge data from trailing edge data and using them together to obtain a measurement of angular inclination of an object such as pitch of a helicopter rotor blade in motion.

Figure 14:
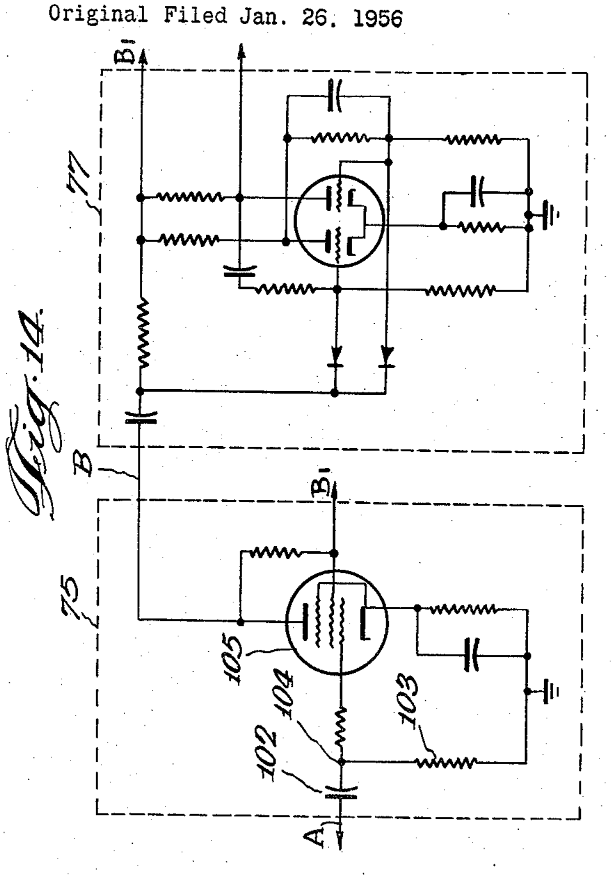
FIGURE 14 is a partial electrical schematic diagram denoting the circuits responsive to the transit configuration of the leading edge of an object.
Figure 15:
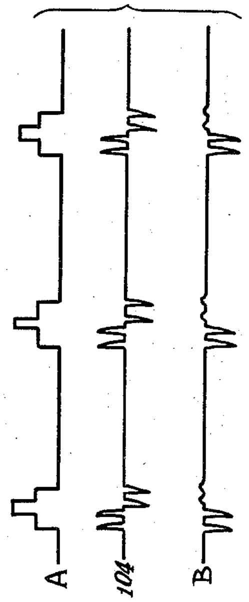
FIGURE 15 is a graphical illustration of the corresponding electrical signals developed in the circuitry of FIGURE 14.

The signal wave form at A in FIGURES 9 and 10 represents the input to element 75 of FIGURE 9 as described. Many circuit means with 75 may be used for interval separation and pulse identification, but a preferred method employs a simple differentiating network in combination with a trigger multivibrator. A more simple arrangement is shown in FIGURE 14 which employs a differentiating circuit operating a near cut-off biased pentode. The enscribed area 75 represents the same circuit function as the block 75 in FIGURE 9. A representation of the input signal wave shape at A is reproduced in FIGURE 15 as occurring at A in FIGURE 14. A condenser 102 and resistor 103 constitute a differentiating network providing a wave form at junction 104 as correspondingly indicated in FIGURE 15. Here, the first two upward or positive pulses correspond to the first two steps in the signal at A which in turn correspond to the transit of the leading edge of the object across the two ray bundles of the sensing device. The second two pulses at 104 in FIGURE 15 are downward or negative and correspond to the transit of the trailing edge. The pentode tube 105 is biased negatively substantially at cut-off, and therefore, disregards further negative signals but does respond to the positive pulses providing amplification of them. The signal at B in FIGURE 14 has approximately the wave form indicated at B in FIGURE 15 and is substantially the same as indicated at B in FIGURES 9 and 10. $B_1$ indicates a suitable positive D.C. power source for the electron tubes. Heater circuits have been deleted for simplicity. The circuit indicated within broken lines 77 constitutes a trigger multivibrator circuit, well known to those versed in the art, which forms the first portion of the gate generator 77 of FIGURE 9. At the repetition rates used, this mulivibrator is bistable, but is also self-resetting for longer intervals as determined by the time constants of the circuit.

Figure 16:
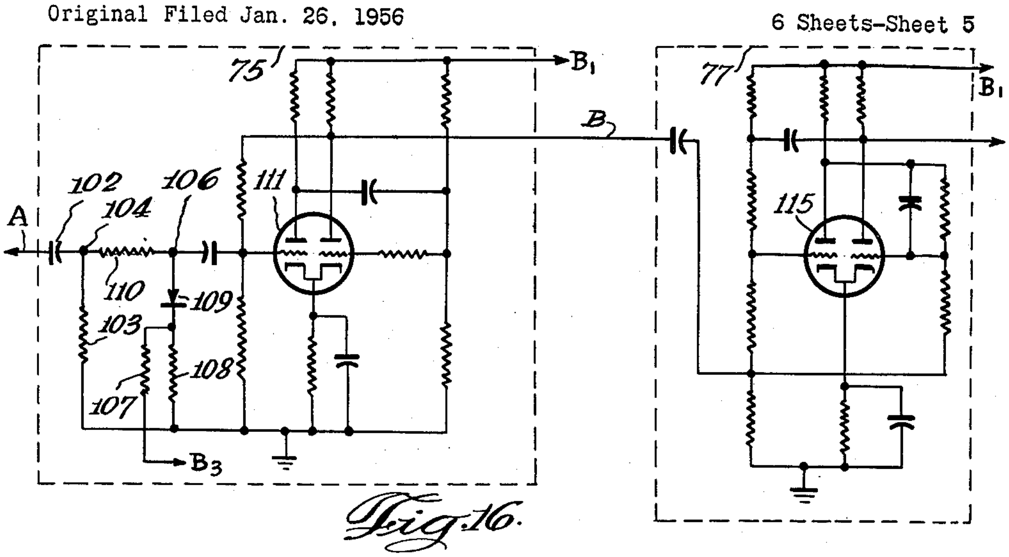
FIGURE 16 is a partial electrical schematic diagram denoting the circuits responsive to the transit configuration of trailing edge of an object.
Figure 17:
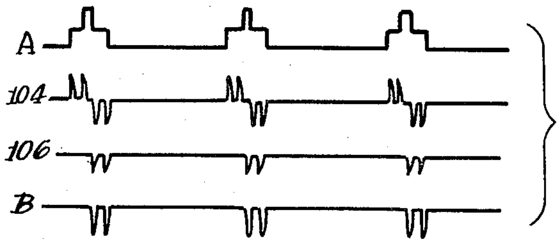
FIGURE 17 is a graphical illustration of the corresponding electrical signals developed in the circuitry of FIGURE 16.

Thus, it is seen that the circuit of FIGURE 14 in combination with a sensing device such as that of FIGURE 6 selects and identifies the transit of the leading edge of an object. In contrast, the circuit of FIGURE 16 selects and identifies the transit of the trailing edge, but either circuit may be used as discussed above for making a variety of determinations of distance or velocity. Like elements in FIGURE 16 are identified with numerals and letters identical with FIGURE 14. FIGURE 17 represents wave forms occurring within FIGURE 16 at the points indicated. A capacitor 102 and resistor 103 have the same differentiating function already indicated, producing the same wave form at junction 104. $B_3$ indicates a suitable D.C. power source which is negative with respect to ground so that through resistors 107 and 108, a suitable negative bias is applied across diode 109 through circuit completing resistors 110 and 103. The polarity of diode 109 is now such as to make it normally conducting. Upward or positive pulses at junction 104 will merely increase the conduction momentarily without providing an actuating signal to the multivibrator circuit which follows, and which includes twin triode tube 111.

The downward or negative pulses at junction 104, however, which are in opposition to the normal bias across diode 109 and are greater in magnitude than the value of the bias, will change the impedance diode 109 from a low to a high value and thus provide a signal pulse at junction 106 to actuate the multivibrator containing tube 111. The multivibrator containing tube 111 is unistable resetting itself after each actuation. The signal at B is therefore as indicated in FIGURE 17, the pulses corresponding to the transit of the trailing edge of an object. The multivibrator indicated as the input portion of 77 and containing tube 115 differs somewhat from that of FIGURE 14 due mainly to the improved character of the signal pulses at B in FIGURE 16. Sufficient explanation of the circuits of FIGURES 14 and 16 has been included here only to illustrate the methods which may be employed for transit identification; additional circuit explanation is not necessary for those versed in the art.

Figure 18:
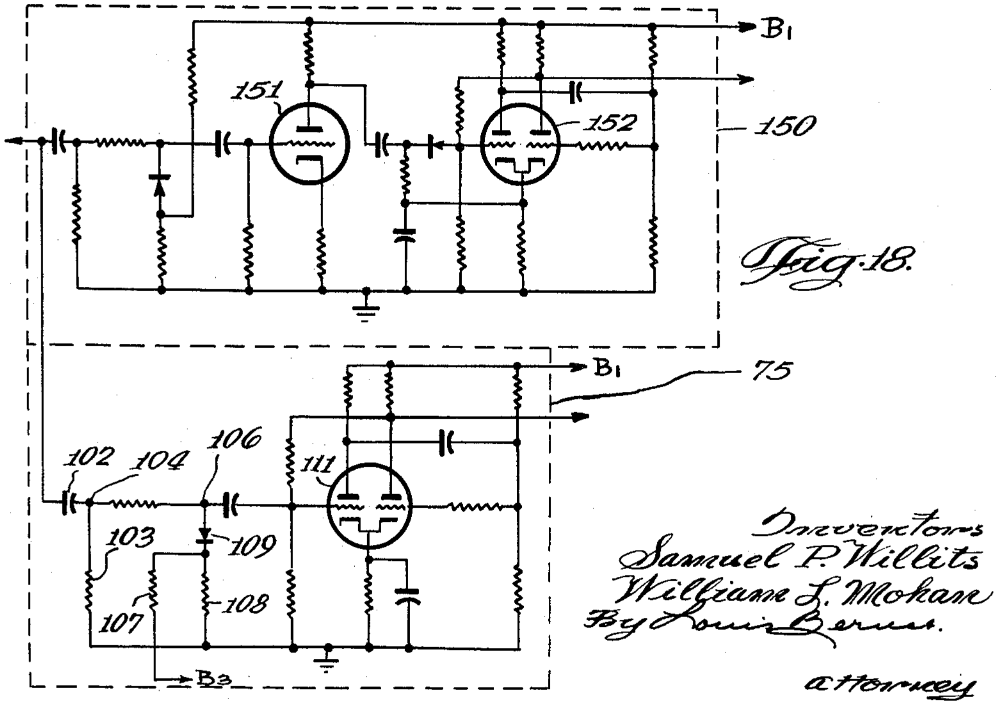
FIGURE 18 is an electrical schematic diagram illustrating a modified circuit responsive to the transit configuration of both the leading and trailing edges independently.

FIGURE 18 illustrates an arrangement substantially described wherein identification of both the leading and trailing edge transits may be made at once. This circuit indicates a pair of blocks, 150 and 75, the upper block identifying the leading edge transits and the lower block identifying trailing edge transits.

Lower block 75 is shown as identical to block 75 of FIGURE 16, like elements being identified with like numerals and letters, and therefore no additional circuit explanation is required. Upper block 150 is similar in construction and operation to blocks 75 and 77 of FIGURE 14. Triode 151 of the former corresponds to pentode 105 of the latter and the trigger multivibrator circuit comprising tube 152 corresponds to the trigger multivibrator circuit of FIGURE 14. The circuit differs slightly in that in the dual identification arrangement of FIGURE 18, the bias point of reference has been shifted from the multivibrator circuit, as is shown in block 77 of FIGURE 14, to the triode 151 to facilitate operation with both leading and trailing edge transits. Otherwise, the circuit components of FIGURE 18 are connected in the manner shown in FIGURE 14 and therefore the operation of the circuits may be determined from the general explanation already given above. Using parallel systems for blocks 77, 78 and 79 of FIGURE 9, special comparison circuits may be employed to provide a meter indication or a means permitting automatic control or correction of rotor blade pitch or angular inclination of other objects in motion.

While the embodiments of the invention illustrated in FIGURES 1 to 18 inclusive utilize either one or two apertures in the opaque disc, embodiments utilizing a plurality of apertures are within the scope of this invention. Some of the additional operational features realizable from the employment of a plurality of apertures will be described by way of example.

FIGURES 19 to 28 inclusive show some of the possible configurations of various numbers of apertures in the opaque disc 2. In FIGURES 19 to 28 inclusive, the views are taken at right angles to the focal surface of the lens and, therefore, at right angles to the plane of the disc 2 and to the reference plane in which a representative moving object 13 moves in the direction indicated by arrow 14. In these figures, also, the intersection of the alternate long and short line segments indicates the location of the optical axis of the lens in the plane of the opaque disc.

Figure 19:
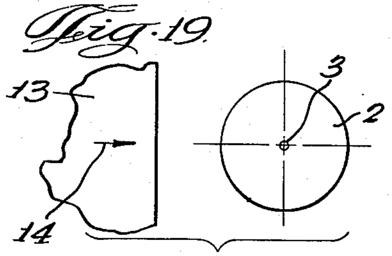
FIGURE 19 illustrates a configuration of a disc with a single aperture for adaptation in the embodiment illustrated in FIGURES 11, 12 and 13.

FIGURE 19 shows a view of the opaque disc 2 with one aperture 3 for use in the embodiment illustrated by FIGURES 11, 12 and 13.

Figure 20:
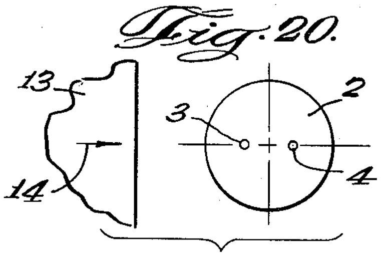
FIGURE 20 illustrates a configuration of a disc with dual apertures for adaptation in the embodiment illustrated in FIGURES 1 through 7.

FIGURE 20 shows a view of opaque disc 2 with two apertures, 3 and 4, for use in the embodiments illustrated by FIGURES 1 to 7 inclusive. The employment of configurations of various numbers of apertures in disc 2, shown in FIGURES 21 *to* 28 inclusive, will be explained with reference to the embodiments illustrated by FIGURES 1 to 7 inclusive. It will be evident, however, that by direct extension of the principles involved, analogous employment of configurations of pluralities of apertures is possible in the embodiment illustrated by FIGURES 11, 12 and 13.

Figure 21:
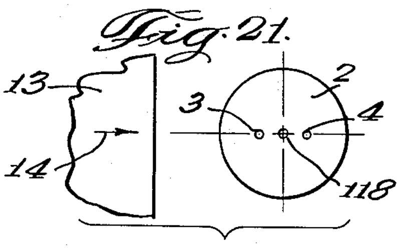
FIGURE 21 illustrates a configuration of a disc with dual apertures to define the parallax angle and a central aperture at the optical axis for orientation of the disc.

In FIGURE 21, additional aperture 118 at the optical axis of the lens is located in a straight line with apertures 3 and 4 and equidistant therefrom. The parallax angle defined by ray bundles focused at apertures 3 and 4 is thus bisected by a ray bundle focused at aperture 118. The time interval during which an edge of the moving body is within the angle defined by ray bundles focused at apertures 3 and 4 is thus divided into two components by the ray bundle focused at aperture 118. These components of the total transit time are equal only when the plane of opaque disc 2 is parallel to the direction of motion 14 of moving body or object 13. Furthermore, these two components are of maximum duration when the straight line along which apertures 3, 118 and 4 lie is parallel to the direction of motion 14 of moving object 13. A comparison of the lengths of the two components of total transit time is accomplished by electronic circuits whose functional operation is shown in FIGURE 18, and the detailed design of which is well known in the art.

The aperture arrangement of FIGURE 21 can also be employed to determine whether moving object 13 is moving from left to right as shown by arrow 14 or whether it is moving in a directly opposed direction; that is, from right to left. If, moving object 13 is an element of a rotating member of an aerodynamic machine, for instance a blade of a helicopter rotor, it is possible to determine whether the direction of rotation of the rotor is clockwise or counterclockwise with respect to a specified point of observation. Thus, if apertures 3, 118 and 4 are oriented in any direction which is not at right angles to the direction of motion 14 of moving object 13, and further if the straight line along which the apertures 3, 118 and 4 lie is not parallel to the direction of motion 14 of moving object 13, the two components of the transit time of moving body 13 will be unequal and the sequence in which these components occur is an indication of whether the moving body is proceeding from left to right as shown in FIGURE 21 or from right to left.

Additional arrangements of a plurality of apertures within the scope of this invention are shown in FIGURES 22 to 28 inclusive. These and other arrangements of apertures permit the realization of the features described earlier for the aperture arrangement illustrated in FIGURE 21, when due regard is given to the arrangement of the electronic circuitry associated with each aperture arrangement as is readily evident to one skilled in the art.

Figure 22:
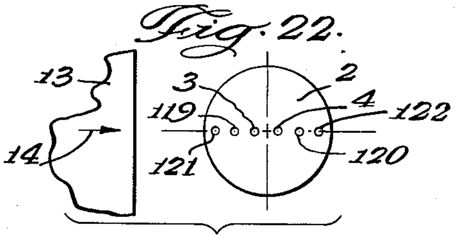
FIGURE 22 illustrates a configuration of a disc employing a colinear array of apertures.

FIGURE 22 illustrates the employment of a colinear array of apertures 3, 4, 119, 120, 121 and 122. Six apertures are shown; however, other numbers of apertures can be used.

Figure 23:
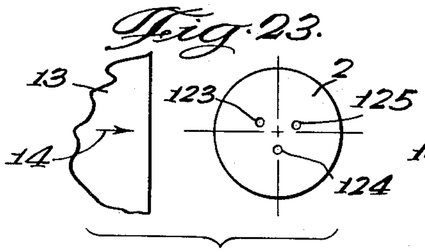
FIGURE 23 illustrates a configuration of a disc employing a triangular array of apertures.
Figure 24:
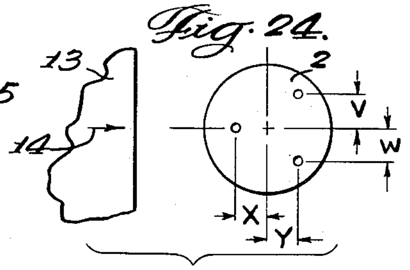
FIGURE 24 illustrates a modified configuration of a disc employing a triangular array of apertures.

FIGURES 23 and 24 illustrate the employment of three apertures, 123, 124 and 125 in opaque disc 2, said apertures being arranged triangular. FIGURE 23 shows the apertures in an arbitrary orientation with respect to the direction of motion 14 of moving object 13.

Figure 25:
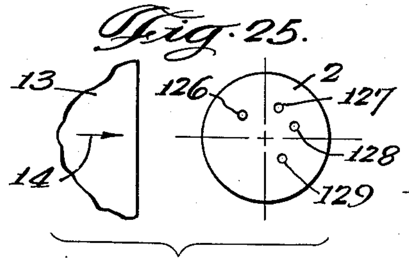
FIGURE 25 illustrates a quadrilateral array of apertures disposed within the disc structure.
Figure 26:
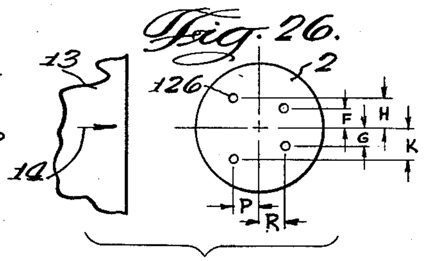
FIGURE 26 illustrates a modified quadrilateral array of apertures disposed within the disc structure.

FIGURES 25 and 26 illustrate the employment of four apertures, 126, 127, 128 and 129 in opaque disc 2, said apertures being arranged at the corners of a quadrilateral. FIGURE 25 shows the apertures in an arbitrary orientation with respect to the direction of motion 14 of moving object 13.

Figure 27:
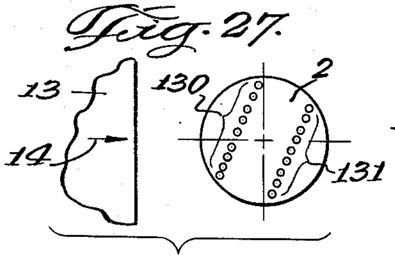
FIGURE 27 illustrates a pair of oblique parallel colinear arrays of apertures positioned on the collimating disc.
Figure 28:
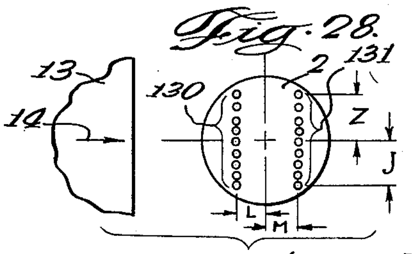
FIGURE 28 illustrates a modified configuration of a group of parallel colinear arrays of apertures positioned on the collimating disc.

FIGURES 27 and 28 illustrate the employment of a pair of parallel colinear rows of apertures 130 and 131 in opaque disc 2. While nine apertures are shown in each row, any reasonable number may be used.

In the aperture arrangement of FIGURE 22, apertures of the pair 3 and 4 are equidistant from the optical axis of the lens while apertures of the pair 119 and 120 are equidistant from the optical axis of the lens and apertures 121 and 122 are equidistant from the optical axis of the lens. Three pairs of apertures are shown, although various numbers of pairs of apertures may be used. By use of suitable pulse selecting electronic circuitry, the electrical response of the phototube or photocell to any selected pair of apertures may be applied to the electronic circuits of FIGURE 9. Inasmuch as the apertures comprising different pairs have different spacings, the angle $\theta$ of FIGURE 1 is thus made selectable for desired performance of the device under various conditions of operation.

In all aperture arrangements, such as shown in FIGURES 19 to 28 inclusive, the electrical signal output from the photocell or phototube due to unintercepted or reflected light focused at one or more apertures can be utilized to determine the intensity of the light reaching the optical sensing device. This will generally be the highest light intensity to which the optical sensing device will be subjected during one transit of the moving body, and the electrical signal corresponding to this highest light intensity can be employed to actuate the automatic gain control such as 76 in FIGURE 9.

While the edge of the moving object 13, which intersects the ray bundles to the optical sensing device, has been shown in the drawings as at right angles to the direction of motion 14, and the operational features realizable from the employment of a plurality of apertures have been explained on the basis of such a right angle relation, although the scope of the invention is not to be limited thereby.

From the above description it will be apparent that this invention provides a unique and novel method for the sensing of parallax interval and for the determination of parallax interval time, which determination may be used as the means for measurement of distance or velocity without physical contact in a wide variety of application. While specific embodiments and arrangements have been illustrated in the above description, it will of course be understood that details of configuration and construction of the invention may be varied through a wide range without departing from the principles of the invention and the scope thereof as defined in the appended claims.

This application is a division of our co-pending application, Serail Number 561,485, filed January 26, 1956, now Patent No. 2,960,908, November 22, 1960.

What is claimed as this invention is:

1. In a system for making parallax interval measurements of a rotating aerodynamic member, the improvement of a sensor comprising, in combination, a housing spaced a predetermined distance from said rotating aerodynamic member and in cooperative relation therewith, projection means positioned within said housing for focusing a plurality of radiant energy beams upon a reference plane, said radiant energy beams being in the path of said rotating aerodynamic member, a radiant energy sensitive device within said housing for receiving said beams and responsive to each interruption thereof by said aerodynamic member for producing an electrical signal, and an opaque member disposed intermediate said projection means and said radiant energy sensitive device at said reference plane and having apertures therein positioned so as to transmit therethrough only said plurality of radiant energy beams.

2. Means for producing signals in accordance with a characteristic of a rotating aerodynamic member comprising a cylindrical housing spaced in operative relation to said aerodynamic member, optical projection means positioned within said housing for focusing a pair of angularly disposed radiant energy beams upon a reference plane, wherein said beams are in the path of said rotating aerodynamic member and are interrupted thereby, a radiant energy sensitive device within said housing for receiving said beams and responsive to each interruption thereof by said aerodynamic member for producing an electrical signal, and an opaque disc disposed intermediate said projection means and said radiant energy sensitive device at said reference plane and having a pair of apertures therein positioned equidistant from the axis of said optical projection means for transmitting therethrough only said pair of radiant energy beams.

3. In a system for testing rotating aerodynamic members the improvement of light sensitive means for receiving a pair of light beams angularly displaced relative to each other and positioned in the path of said rotating aerodynamic members so as to be interrupted thereby, optical projection means including a lens member for focusing said beams upon a reference plane, a disc-like opaque member at said reference plane having an aperture therein associated with each of said light beams, each aperture being adapted to transmit only its associated beam therethrough, said light sensitive means including a photocell adapted to produce an electrical pulse for each interruption of said light beams there being at least a pair of such pulses having a spacing determined by the parallax interval of said aerodynamic members for each traverse of said members through the pair of beams.

4. A parallax sensing system for an aerodynamic member adapted to rotate about an axis comprising optical detection means for receiving a pair of radiant energy rays positioned in the path of said aerodynamic member so as to be interrupted thereby, said optical detection means being spaced a predetermined distance from said aerodynamic member, said detection means comprising an opaque member having a pair of apertures therein, optical projection means for focusing said rays upon said opaque member such that said rays are transmitted through said apertures, radiant energy sensitive means adapted to receive said focused rays and to produce an electrical pulse for each interruption thereof, there being a pair of such pulses having a spacing determined by the velocity of said aerodynamic member for each traverse thereof through the pair of rays.

5. In a parallax interval system for measuring the motion of an aerodynamic member, the combination comprised of a housing, optical means positioned within said housing for transmitting light rays therethrough, said light rays being in the path of travel of said aerodynamic member and being interrupted thereby, photomultiplier means within said housing adapted to convert said light rays to electrical signals and amplify the same, and an opaque member disposed intermediate said optical means and said photomultiplier means, said opaque member having a plurality of apertures therein, each corresponding to one of said light rays and arranged for transmitting only its associated light ray to said photomultiplier means.

6. In a parallax interval system for measuring a rotating aerodynamic member, the combination of a cylindrical housing, lens means positioned within said housing for transmitting light rays therethrough, photomultiplier means within said housing adapted to convert the transmitted light rays to electrical signals and amplify the same, and a disc-like opaque member disposed intermediate said lens means and said photomultiplier means, said opaque member having an aperture therein, corresponding to each one of said light rays and arranged for transmitting only said light-rays as are interrupted by said moving object to said photomultiplier means.

7. In a parallax interval system for an aerodynamic member adapted for rotation through a plurality of light rays to provide successive interruption thereof the combination comprising a housing in spaced relation to said aerodynamic member, optical means positioned within said housing for transmitting said light rays therethrough, photomultiplier means within said housing adapted to convert said light rays to electrical signals and amplify the same, and an opaque member disposed intermediate said optical means and said photomultiplier means, said opaque member having a plurality of apertures therein, each arranged for transmitting only a desired one of said light rays therethrough to said photomultiplier means.

8. In a parallax interval system for detecting spatial distance error between a datum plane and a rotating aerodynamic member, the combination comprising an opaque housing spaced a given distance from said member, optical means positioned within said housing for transmitting light rays therethrough, said rays being sequentially interrupted by said aerodynamic member, photomultiplier means within said housing adapted to convert said light rays to electrical signals and amplify the same, and an opaque member disposed intermediate said optical means and said photomultiplier means, said opaque member having a plurality of apertures therein, each corresponding to one of said light rays and arranged for transmitting to said photomultiplier means only such rays as are focused upon said opaque member by said optical means.

9. In a parallax interval system for remote measurements of a rotating aerodynamic member the combination of an opaque housing spaced a predetermined distance from the rotating aerodynamic member, first light transmission means for projecting beams of radiant energy therethrough, said beams being in the path of said rotating aerodynamic member and being interrupted thereby, an opaque member positioned in cooperative relation to said first light transmission means and having an aperture therein for passing each of said beams of radiant energy, radiant energy sensitive means positioned for receiving said beams and producing electrical signals in accordance with the interruptions therein by said members, and second light transmission means disposed intermediate said opaque member and said radiant energy sensitive means for projecting the rays passed by the former upon desired predetermined areas of the latter.

10. In a system for making optical measurements of a rotating blade, the combination of first light transmission means spaced from the rotating blade and adapted to receive plural light beams disposed in the path of and interrupted by said blade, an opaque member positioned in cooperative relation to said first light transmission means and having an aperture therein for passing each of said light beams, said opaque member being disposed at the focal plane of said first light transmission means, photosensitive means positioned for receiving said light beams and producing electrical signals in accordance therewith, and second light transmission means disposed intermediate said opaque member and said photosensitive means for projecting the beams passed by the former upon desired predetermined areas of the latter.

No references cited.